Figure 1:
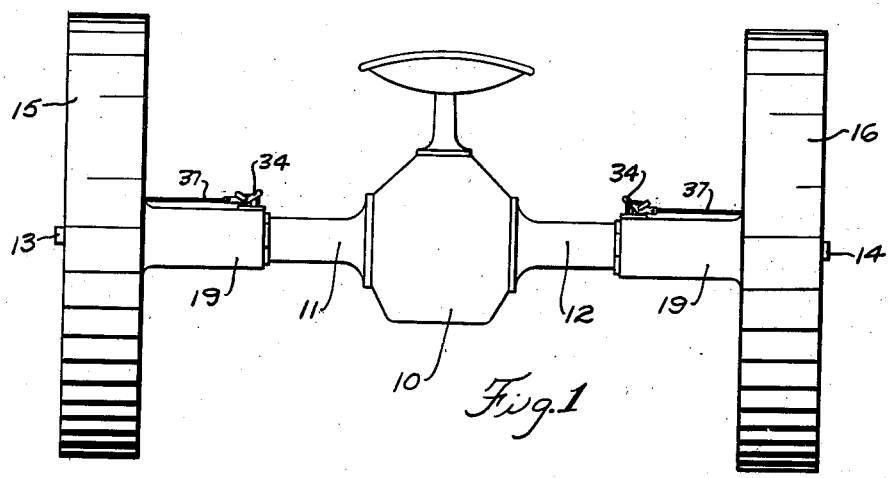

April 29, 1941.  H. A. MINTURN  2,240,312
MEANS FOR ADJUSTING TRACTOR WHEELS
Filed Feb. 24, 1940  3 Sheets-Sheet 1

Inventor
Herbert A. Minturn,
By Minturn & Minturn
Attorneys

April 29, 1941. H. A. MINTURN 2,240,312
MEANS FOR ADJUSTING TRACTOR WHEELS
Filed Feb. 24, 1940 3 Sheets-Sheet 2
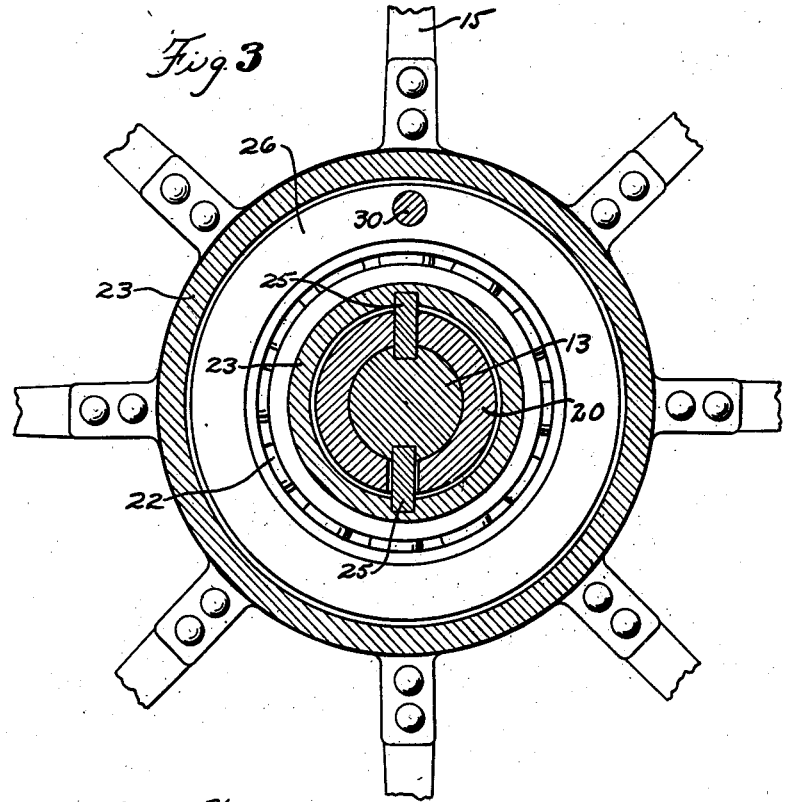
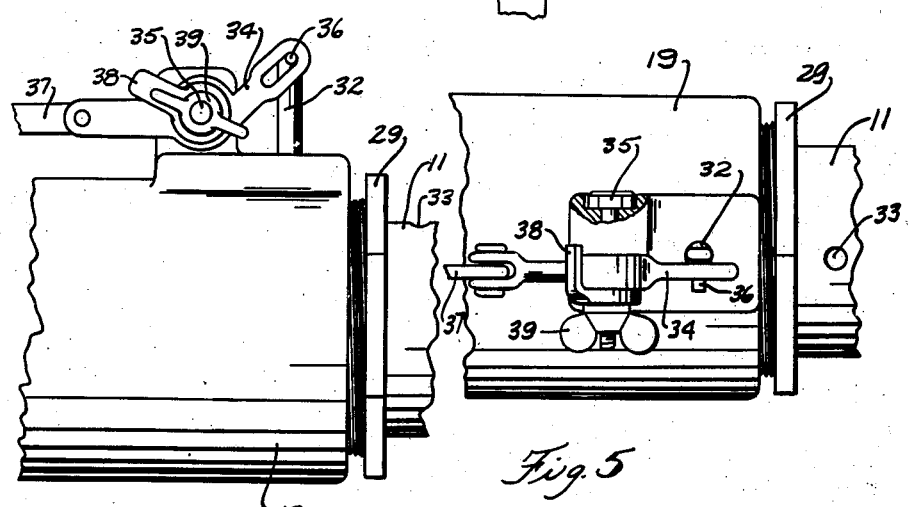
Inventor
Herbert A. Minturn,
By Minturn & Minturn,
Attorneys April 29, 1941.　　　H. A. MINTURN　　　2,240,312
MEANS FOR ADJUSTING TRACTOR WHEELS
Filed Feb. 24, 1940　　　3 Sheets-Sheet 3
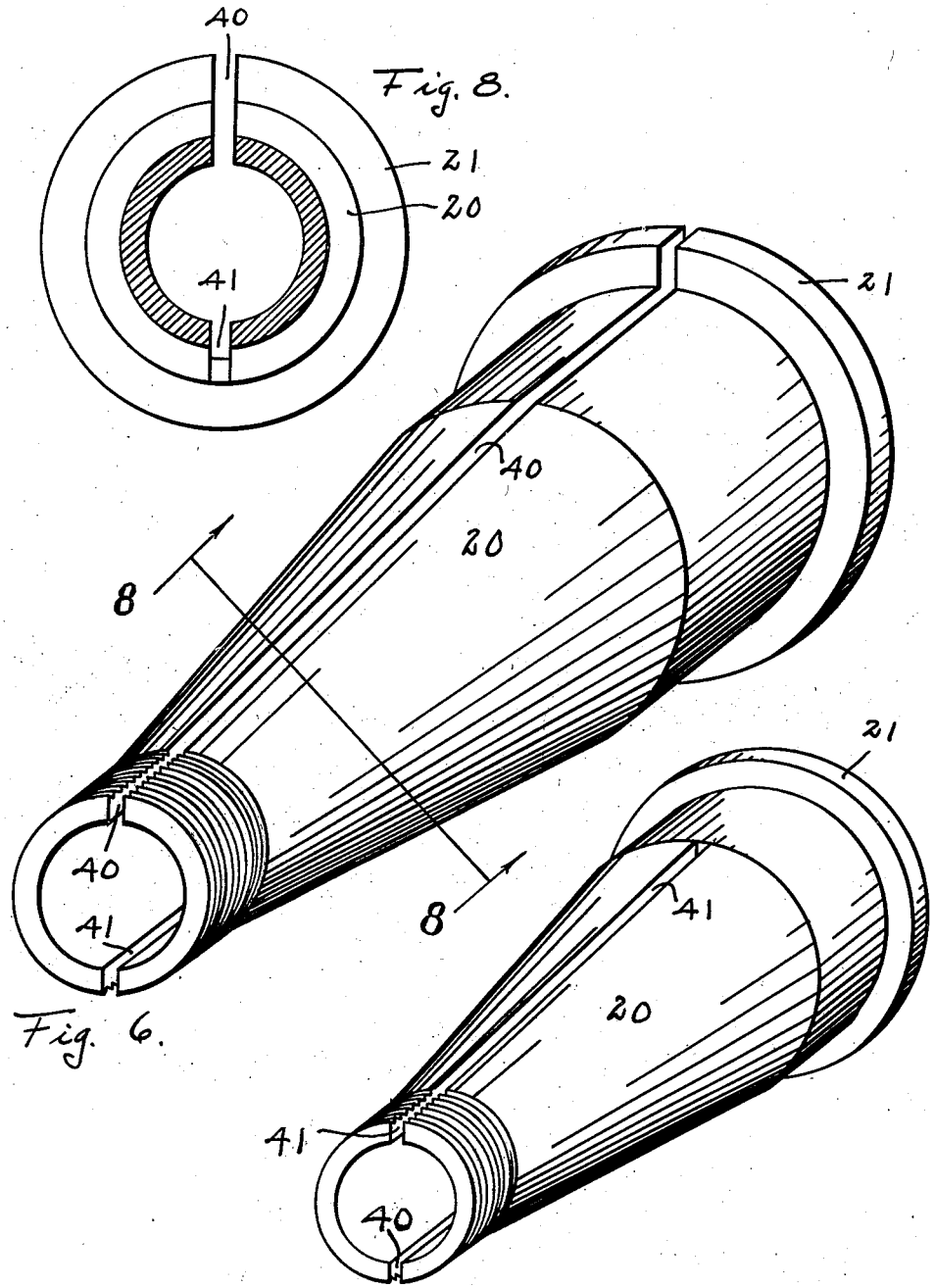

Patented Apr. 29, 1941

2,240,312

UNITED STATES PATENT OFFICE 2,240,312

MEANS FOR ADJUSTING TRACTOR WHEELS

Herbert A. Minturn, near Indianapolis, Ind.

Application February 24, 1940, Serial No. 320,543

9 Claims. (Cl. 180—1)

This invention relates to means for variably spacing apart the drive wheels of a vehicle such as a farm tractor. It has been a common construction to provide farm tractors with wheels that may be adjustably positioned along drive shafts that extend horizontally, one from each side, from a central differential housing. The usual construction has provided means for clamping the wheels to the shafts to secure the fixed drive relation therewith. When ground is being broke, it is desirable to have the drive wheels spaced inwardly toward the differential housing but when row crops are to be cultivated, then these wheels must be spaced further or closer apart in order to bring them in proper alignment with the rows. Generally the drive shafts have been splined and exposed to the weather with the result that in many cases the wheels have been exceedingly difficult of even being loosened on the shafts, and then the further difficulty has been encountered in shifting the wheels to the required positions along the shafts. I am aware of the fact that other devices have been offered to provide means for easily shifting the wheels as desired but such means would be extremely costly to manufacture and present difficulties in their operations.

In the invention herein set forth, means are provided to permit shifting of the wheels with a minimum number of preliminary operations followed by merely driving the tractor forwardly or rearwardly depending upon which way the wheels are to be shifted on the drive shafts.

A further important object of the invention is to permit the use of a smaller drive shaft in view of the fact that an outer bearing is provided adjacent the wheel in an extension of the differential housing regardless of the position of the wheel along the shaft. A further advantage of the invention is that in the construction employed there is no tendency for the wheel to become frozen to the shaft, but on the contrary the wheel may be quickly loosened, particularly in the one form of the invention, simply by loosening a single nut, and if necessary, tapping the nut inwardly toward the wheel to immediately free the wheel on the shaft and then permit it to be shifted longitudinally of the shaft.

A further important advantage of the invention is to be found in the means for keeping the screw-threads clean and free of congealed grease and dirt in advance of engagement of the threads with a co-operating member.

Figure 2:
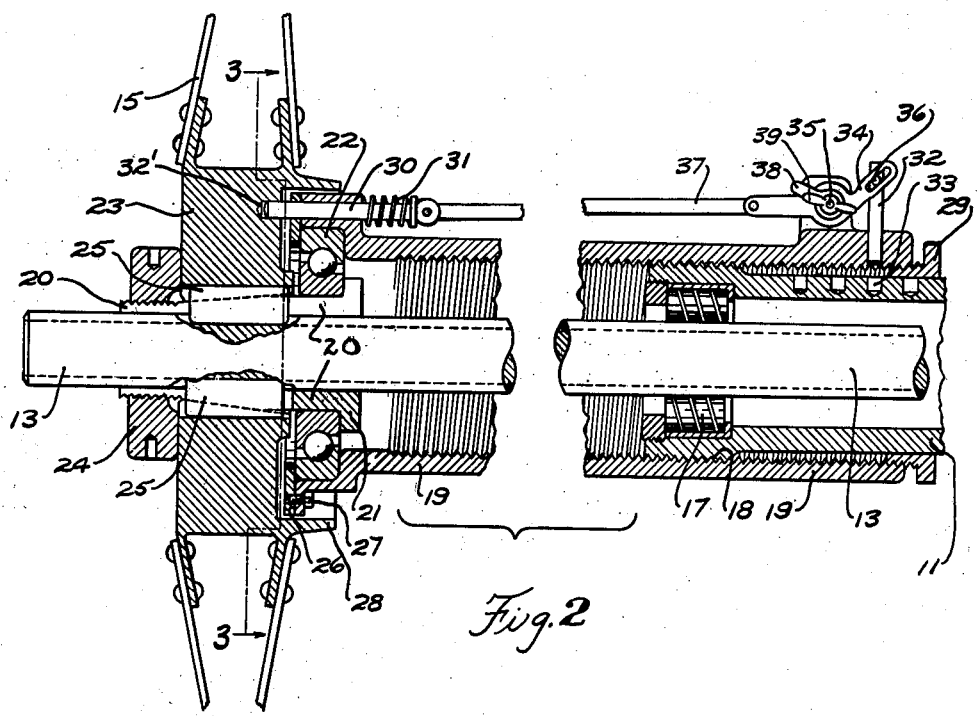

Other important objects and advantages of the invention will become apparent in the following description which is illustrated by the accompanying drawings, in which Fig. 1 is a rear view of a rear axle and wheel assembly of a tractor;

Fig. 2, a view on an enlarged scale in detail on a central vertical section through the wheel and housing assembly;

Fig. 3, a transverse vertical section on the line 3—3 in Fig. 2;

Fig. 4, a detail in side elevation on a still further enlarged scale of the interlocking mechanism; and Fig. 5, a top plan view of that mechanism.

Fig. 6, a view in perspective on an enlarged scale of a wheel securing collar;

Fig. 7, a view in perspective on a slightly smaller scale from the reverse side of the collar; and Fig. 8, a transverse section on the line 8—8 in Fig. 6.

Like characters of reference indicate like parts throughout the several views in the drawings.

Referring to the drawings, the central differential housing 10, Fig. 1, is provided with the usual laterally extending axle housings 11 and 12. Through these extensions 11 and 12 extend the usual driving shafts 13 and 14 to drive the wheels 15 and 16. Since both wheels 15 and 16 are mounted and shifted in exactly the same manner, the description of the mechanism for one wheel will be sufficient to describe the invention, and accordingly the description will be given in reference to the mechanism as applied to the wheel 15.

The housing extension 11 carries the drive shaft 13 by the usual bearing 17 in the outer end of the housing, this bearing being herein shown as of a roller bearing type. The axle housing 11 is provided with an annularly raised portion which carries external threads 18. A housing sleeve 19 is internally threaded to have its threads engage with the threads 18 so that the housing 19 will be extended or retracted from the end of the axle housing 11 in telescoping manner.

A sleeve 20, generally conical in exterior shape, is provided with a cylindrical bore to permit it to be received with a sliding fit over the drive shaft 13. The sleeve 20 is provided with an inner integral collar 21 adjacent which is a cylindrical surface to receive thereon and in abutment with the collar 21 any suitable bearing 22, herein shown as a ball bearing although other types of bearings may be equally as well employed. The hub 23 of the wheel 15 is provided with a tapered bore corresponding with the taper of the collar 20 and a nut 24 screw-threadedly engages by its threads with the outer and smaller threaded end of the collar 20 to abut the outer face of the hub 23 and thereby urge the hub 23 inwardly on the collar 20 into a tight wedging fit therewith. One or more keys 25 are provided to extend through slots 40 and 41 in the collar 20 to inter-engage keyways in the hub 23 and in the shaft 13. Preferably the collar 20 is provided with the slot 40 entirely thereacross, longitudinally, to permit contraction against the axle 13.

The bearing 22 is carried in an annular channel about the outer end of the sleeve 19 and is retained therein by any suitable means such as by an annular plate 26 drawn against the outer face of the sleeve 19 by means of cap screws 27. Preferably the hub 23 is provided with an annularly inwardly extending flange 28 as a means for shielding the bearing against entrance of dirt.

Preferably, although not necessarily so, a screw-threaded bushing 29 is formed to have an internal bore slidably fitting about the external surface of the axle housing 11 and has external threads screw-threadedly engaging within the sleeve 19. This bushing 29 is only employed as a means of preventing a rocking motion about the threads 18 so as to give a rigid support to the bearing 22 in the outer end of the sleeve and thereby relieve some of the load on the axle shaft 13. However, where the threaded portion 18 is of sufficient longitudinal length, this bushing 29 may be dispensed with.

A pin 30 is slidably carried in a bore through the outer end of the sleeve 19 to be reciprocable in the present form parallel to the axis of the shaft 13. It is, of course, conceivable that the pin 30 may enter through the flange 28 into locking engagement with the sleeve 19 as will be apparent in the following description. The pin 30 is normally urged into an inner or non-engaging position by means of the spring 31 so as to have its outer end out of contact with the wheel hub 23. When the pin 30 is urged into its outer position in opposition to the spring 31, the pin 30 will have its inner end drop into a suitable receiving hole 32' formed in the inner face of the hub 23. When the pin 30 is thus engaged to interlock the sleeve 19 with the hub 23, the sleeve 19 must turn the hub 23. This motion, however, is not possible until the wheel is free to travel longitudinally of the shaft 13. This condition is effected by loosening the nut 24 and running it out a sufficient distance on the sleeve 20 as will permit a slight relative movement longitudinally between the sleeve 20 and the hub 23 but not to such an extent as would permit any considerable degree of wabbling of the wheel about the sleeve. When the nut 24 is thus loosened, the tractor may be set in motion either forwardly or rearwardly depending upon the direction in which the wheel 15 is to be moved along the shaft 13. Thus as the wheel 15 is driven through the shaft 13, it will in turn, through the pin 30, revolve the sleeve 19 about the housing 11 and since the sleeve is screw-threadedly engaged with the housing, the sleeve will either travel outwardly or inwardly over the housing depending upon the direction of the threads.

Assuming that the wheel 15 is to be pulled inwardly toward the differential housing 10, the sleeve 19 will, through the plate 27, carry the bearing 22 against the collar 21 of the sleeve 20 and thereby tend to pull that sleeve through the hub 23 until the nut 24 is in abutment with the outer face of the hub. Thereafter continued turning of the sleeve 19 will slide the wheel 15 inwardly along the shaft 13, driving relation being maintained between the wheel hub 23 and the shaft 13 through the keys 25. Then when the desired position of the wheel 15 is reached, the tractor is stopped, the nut 24 tightened up, and the pin 30 allowed to return to its normal position, whereupon the tractor may be immediately operated without further adjustments.

It is desirable to lock the sleeve 19 into any one of the adjusted positions. Any locking engagement between the sleeve 19 and the housing 11 will achieve this result. In the present form, a pin 32 is mounted to slide through the sleeve 19 selectively into any one of a number of sockets 33 provided along the housing 11. An interlocking effect is produced by providing a bell crank 34 rockably mounted on the bolt 35 to have a pin 36 extending from the locking pin 32 through a slot in one arm of the crank. The other arm of the crank 34 has a rod 37 pivotally engaged therewith and extending to a pivotal engagement with pin 30. By shifting the bell crank around to have its outer arm drop down to carry the rod 37 into a position parallel with the axle 13, the pin 30 may be maintained in its outwardly extended position while the pin 32 is lifted out of locking engagement with the axle housing 11 whereupon longitudinal shifting of the sleeve 19 is had as above explained. By lifting the bell crank outwardly away from the sleeve 19, by its outer arm, the spring 31 will then be in control to cause the bell crank to push the pin 32 down against the housing 11 to engage in any one of the sockets 33 next appearing upon suitable turning of the sleeve 19 while at the same time the pin 30 will be sufficiently withdrawn from the hub 23 to prevent further interconnection between the hub and the sleeve when this pin 32 starts to enter any one of these sockets 33. A fixed locking device is had in the form of a finger 38 which extends over the bell crank between the two arms and is rockably supported on the bolt 35. A thumb or wing nut 39 engages the outer end of the bolt 35 as a means for securing the finger 38 in either of its extremely rocked positions against the arms of the bell crank.

It is to be noted that when the wheel 15 is to be shifted to an outward position, turning of the sleeve 19 will cause the bearing 22 to push directly against the hub 23 tending to loosen the hub on the sleeve 20 in that position, the bearing tending to pull the sleeve longitudinally through the hub 23 when traveling in the reverse direction as above indicated. In other words, there is that action set up whereby the sleeve 20 is tended to be loosened in the hub of the wheel as well as on the shaft 13 by the turning of the sleeve 19. Any tendency of the sleeve 20 to freeze to the shaft 13 or to the hub 23 may be overcome by tapping the nut 24 as it is loosened so as to drive the sleeve 20 relatively inwardly of the hub 23. By having the sleeve 19 surround the shaft 13 between the wheel and the outer end of the housing 11, that particular part of the shaft 13 is always enclosed and thus protected against accumulation of grease and dirt settling into the keyways.

While the invention is herein shown in the one specific form, it is entirely obvious that structural changes may be employed without departing from the spirit of the invention and I, therefore, do not desire to be limited to that precise form beyond the limitations as may be imposed by the following claims.

I claim:

1. In a tractor having an adjustable tread, an axle housing, an axle revolubly carried through the housing and extending outwardly therebeyond, a tractor wheel through which the axle extends and is drivingly connected, a sleeve surrounding said axle and screw-threadedly engaging said axle housing to telescope therewith, and means for engaging the sleeve with said wheel, the driving connection of said wheel with the axle comprising key means to permit the wheel to shift along the axle, and means for engaging the wheel with the axle in a relatively fixed manner at selected positions along the axle.

2. In a tractor having an adjustable tread, an axle housing, an axle revolubly carried through the housing and extending outwardly therebeyond, a tractor wheel through which the axle extends and is drivingly connected, a sleeve surrounding said axle and screw-threadedly engaging said axle housing to telescope therewith, and means for engaging the sleeve with said wheel, the driving connection of said wheel with the axle comprising key means to permit the wheel to shift along the axle, and means for engaging the wheel with the axle in a relatively fixed manner at selected positions along the axle, said wheel and axle interengaging means comprising a sleeve between the wheel and the axle, and means interconnecting said wheel sleeve with said telescoping sleeve for longitudinal travel therewith.

3. In a tractor having an adjustable tread, an axle housing, an axle revolubly carried through the housing and extending outwardly therebeyond, a tractor wheel through which the axle extends and is drivingly connected, a sleeve surrounding said axle and screw-threadedly engaging said axle housing to telescope therewith, and means for engaging the sleeve with said wheel, the driving connection of said wheel with the axle comprising key means to permit the wheel to shift along the axle, and means for engaging the wheel with the axle in a relatively fixed manner at selected positions along the axle, and means interconnecting with said wheel sleeve shifting said wheel longitudinally of said axle with said telescoping sleeve.

4. In a tractor having an adjustable tread, an axle housing, an axle revolubly carried through the housing and extending outwardly therebeyond, a tractor wheel through which the axle extends and is drivingly connected, a sleeve surrounding said axle and screw-threadedly engaging said axle housing to telescope therewith, and means for engaging the sleeve with said wheel, the driving connection of said wheel with the axle comprising key means to permit the wheel to shift along the axle, and means for engaging the wheel with the axle in a relatively fixed manner at selected positions along the axle, said wheel and axle interengaging means comprising a sleeve between the wheel and the axle, and means interconnecting said wheel sleeve with said telescoping sleeve for longitudinal travel therewith, said wheel sleeve being externally conical and entering a conical bore in the wheel, means independent of said telescoping sleeve for drawing said wheel sleeve into tight engagement with said wheel bore, and said wheel sleeve being longitudinally split to permit contraction about the axle when carried into said tight wheel engagement.

5. In a tractor having an adjustable tread, an axle housing, a rotatable axle extending from each end of said housing, a sleeve telescoping over each axle and its respective housing end, screw-threads interengaging the sleeves and their respective housing ends, a tractor wheel on each axle, a releasable driving connection between each wheel and its axle to permit longitudinal shifting therealong to selected fixed positions therewith, means revolubly connecting each sleeve with the wheel on the axle through that sleeve, and releasable means for fixing said sleeve in relation to the wheel to cause the wheel to revolve selectively its sleeve in unison therewith to produce a corresponding shifting of the wheel along its axle.

6. In a tractor having an adjustable tread, an axle housing, a rotatable axle extending from each end of said housing, a sleeve telescoping over each axle and its respective housing end, screw-threads interengaging the sleeves and their respective housing ends, a tractor wheel on each axle, a releasable driving connection between each wheel and its axle to permit longitudinal shifting therealong to selected fixed positions therewith, means revolubly connecting each sleeve with the wheel on the axle through that sleeve, and releasable means for fixing said sleeve in relation to the wheel to cause the wheel to revolve selectively its sleeve in unison therewith to produce a corresponding shifting of the wheel along its axle, said revolvable connecting means in each instance comprising a wheel bearing carried by and shiftable with said sleeve adjacent its outer end, a wheel hub through the bearing, and hub carried abutments on each side of the bearing.

7. In a tractor having an adjustable tread, an axle housing, an axle revolubly carried through the housing and extending outwardly therebeyond, a tractor wheel to which the axle is drivingly connected, a sleeve surrounding said axle and screw-threadedly engaging said axle housing to telescope therewith, and means for connecting the sleeve with said wheel optionally therewith, and means for releasably locking the sleeve to the axle housing.

8. In a tractor having an adjustable tread, an axle housing, an axle revolubly carried through the housing and extending outwardly therebeyond, a tractor wheel through which the axle extends and is drivingly connected, a sleeve surrounding said axle and screw-threadedly engaging said axle housing to telescope therewith, and means for engaging the sleeve with said wheel optionally therewith, and means for releasably locking the sleeve to the axle housing, and further means oppositely operating both said sleeve wheel engaging means and said sleeve to axle housing locking means.

9. In a tractor having an adjustable tread, an axle housing, an axle revolubly carried through the housing and extending outwardly therebeyond, a tractor wheel through which the axle extends and is drivingly connected, a sleeve surrounding said axle and screw-threadedly engaging said axle housing to telescope therewith, and means for engaging the sleeve with said wheel, the driving connection of said wheel with the axle comprising key means to permit the wheel to shift along the axle, and means for engaging the wheel with the axle in a relatively fixed manner at selected positions along the axle, said wheel and axle interengaging means comprising a sleeve between the wheel and the axle, and means interconnecting said wheel sleeve with said telescoping sleeve for longitudinal travel therewith, said wheel sleeve being externally conical and entering a conical bore in the wheel, means independent of said telescoping sleeve for drawing said wheel sleeve into tight engagement with said wheel bore, and said wheel sleeve being longitudinally split to permit contraction about the axle when carried into said tight wheel engagement, said wheel and telescoping sleeve interconnecting means being formed to permit initial relative travel between said wheel sleeve and said wheel upon turning of the telescoping sleeve to shift the wheel along said axle.

HERBERT A. MINTURN.